US012347362B2

(12) United States Patent
Kim et al.

(10) Patent No.: US 12,347,362 B2
(45) Date of Patent: Jul. 1, 2025

(54) DATA DRIVER AND DISPLAY DEVICE INCLUDING THE SAME

(71) Applicant: Samsung Display Co., Ltd., Yongin-Si (KR)

(72) Inventors: Daehyun Kim, Yongin-si (KR); Sunghwan Kim, Yongin-si (KR); Jung Hoon Shim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/433,449

(22) Filed: Feb. 6, 2024

(65) Prior Publication Data

US 2024/0274058 A1 Aug. 15, 2024

(30) Foreign Application Priority Data

Feb. 13, 2023 (KR) ........................ 10-2023-0018669

(51) Int. Cl.
*G09G 3/20* (2006.01)
*G09G 3/3233* (2016.01)

(52) U.S. Cl.
CPC ... *G09G 3/2092* (2013.01); *G09G 2300/0452* (2013.01); *G09G 2310/027* (2013.01); *G09G 2310/0291* (2013.01); *G09G 2320/0242* (2013.01); *G09G 2330/021* (2013.01)

(58) Field of Classification Search
CPC ......... G09G 3/2092; G09G 2300/0452; G09G 2310/027; G09G 2310/0291; G09G 2320/0242; G09G 2330/021; G09G 3/3233; G09G 3/3275; G09G 3/3291; G09G 3/20; G09G 2310/0243; G09G 2310/0264; G09G 2310/0275; G09G 3/3688; G09G 2310/08; H10K 59/353
See application file for complete search history.

(56) References Cited

U.S. PATENT DOCUMENTS

| | | | | |
|---|---|---|---|---|
| 2017/0336851 | A1* | 11/2017 | Bae | G09G 3/2003 |
| 2018/0012542 | A1* | 1/2018 | Lee | G09G 3/3275 |
| 2020/0388205 | A1* | 12/2020 | Bae | G09G 3/2003 |
| 2022/0036802 | A1* | 2/2022 | Kim | G09G 3/20 |

FOREIGN PATENT DOCUMENTS

| | | | |
|---|---|---|---|
| JP | 3636192 | B2 | 4/2005 |
| KR | 10-2016-0096778 | A | 8/2016 |
| KR | 10-2022-0048519 | A | 4/2022 |
| KR | 10-2022-0095399 | A | 7/2022 |
| KR | 10-2023-0059889 | A | 5/2023 |

* cited by examiner

*Primary Examiner* — Antonio Xavier
(74) *Attorney, Agent, or Firm* — Innovation Counsel LLP

(57) ABSTRACT

A display device includes a display panel including pixel driving circuits and light emitting elements, a data driver that outputs data voltages to the pixel driving circuits, and a timing controller that controls the data driver. The data driver includes a first amplifier and second amplifiers. The first amplifier outputs first data voltages to a first data line connected to first pixel driving circuits arranged in a first column and output second data voltages to a second data line connected to second pixel driving circuits arranged in a second column. The second amplifiers output third data voltages to third data lines connected to third pixel driving circuits arranged in third columns which are disposed between the first column and the second column. Thus, the display device reduces the number of amplifiers included in the data driver.

19 Claims, 13 Drawing Sheets

DATA DRIVER AND DISPLAY DEVICE INCLUDING THE SAME

CROSS-REFERENCE TO RELATED APPLICATION

This application claims priority under 35 USC § 119 to Korean Patent Application No. 10-2023-0018669 filed on Feb. 13, 2023, in the Korean Intellectual Property Office (KIPO), the entire disclosure of which is incorporated herein by reference.

BACKGROUND

1. Field

Embodiments of the present disclosure relate to a data driver and a display device including the data driver. More particularly, embodiments of the present disclosure relate to a data driver that outputs data voltages to pixel driving circuits and a display device including the data driver.

2. Description of the Related Art

In general, a display device may include a display panel, a gate driver, a data driver, and a timing controller. The display panel may include a plurality of gate lines, a plurality of data lines, and a plurality of pixel driving circuits electrically connected to the gate lines and the data lines. The gate driver may provide gate signals to the gate lines, the data driver may provide data voltages to the data lines, and the timing controller may control the gate driver and the data driver.

Recently, in order to increase a resolution of a display screen, a display device having an RGBG arrangement in which two adjacent light emitting element groups (or unit light emitting elements) share a blue light emitting element and/or a red light emitting element has been developed. According to the display device having the RGBG arrangement, each of the light emitting element groups (or each of the unit light emitting elements) may have two light emitting elements which are a green light emitting element and a red or blue light emitting element so that a unit pixel size may be reduced, and thus a resolution of the display device may be increased.

However, according to the conventional display device having the RGBG arrangement, the light emitting elements having mutually different colors, for example, the red and blue light emitting elements, may be alternately connected to one data line. Accordingly, a power may be consumed for charging/discharging of the data line so that the data line may alternately have data voltages for the light emitting elements having the mutually different colors.

SUMMARY

An object of the present disclosure is to provide a data driver including an amplifier capable of outputting data voltages to a plurality of data lines.

Another object of the present disclosure is to provide a display device including the data driver.

However, the object of the present disclosure is not limited thereto. Thus, the object of the present disclosure may be extended without departing from the spirit and the scope of the present disclosure.

According to embodiments, a display device may include a display panel including pixel driving circuits and light emitting elements, a data driver configured to output data voltages to the pixel driving circuits, and a timing controller configured to control the data driver. Here, the data driver may include a first amplifier configured to output first data voltages to a first data line connected to first pixel driving circuits arranged in a first column and output second data voltages to a second data line connected to second pixel driving circuits arranged in a second column and second amplifiers configured to output third data voltages to third data lines connected to third pixel driving circuits arranged in third columns which are disposed between the first column and the second column.

In an embodiment, the first amplifier may be configured to selectively output the first data voltages to the pixel driving circuits connected to the first data line and the second data voltages to the pixel driving circuits connected to the second data line.

In an embodiment, the first amplifier may be configured to alternately output the first data voltages to the pixel driving circuits connected to the first data line and the second data voltages to the pixel driving circuits connected to the second data line.

In an embodiment, the first data line and the second data line may be connected to each other through a connection line, and the first amplifier may be connected to the connection line.

In an embodiment, the display panel may include a display part configured to display an image and a peripheral part disposed adjacent to the display part, and the connection line may be disposed in the peripheral part.

In an embodiment, the first amplifier and the second amplifiers may be disposed adjacent to the display panel in a second direction, and the connection line may be disposed adjacent to the display part in the second direction.

In an embodiment, the first amplifier and the second amplifiers may be disposed adjacent to the display panel in a second direction, and the connection line may be disposed adjacent to the display part in a direction opposite to the second direction.

In an embodiment, the display panel may include a display part configured to display an image and a peripheral part disposed adjacent to the display part, and the connection line may be disposed in the display part.

In an embodiment, the pixel driving circuits arranged in the first column may be configured to drive the light emitting elements arranged in the first column, and the pixel driving circuits arranged in the second column may be configured to drive the light emitting elements arranged in at least one of the third columns.

In an embodiment, each of the first data line, the second data line, and the third data lines may be connected to the pixel driving circuits which drive the light emitting elements configured to display a same color.

In an embodiment, the first column may include first color light emitting elements configured to display a first color and third color light emitting elements configured to display a third color. In addition, at least one of the third columns may include second color light emitting elements configured to display a second color.

In an embodiment, the first amplifier is configured to output data voltages to the first data line and the second data line in response to a first clock signal and to output data voltages to at least one third data line among the third data lines in response to a second clock signal.

In an embodiment, the second clock signal may have a phase that is opposite to a phase of the first clock signal.

In an embodiment, each of the second amplifiers may be configured to output data voltages to at least one third data line in response to a first clock signal and to output the data voltages to at least another third data lines in response to a second clock signal.

According to embodiments, a data driver configured to output data voltages to pixel driving circuits of a display panel connected to first to third data lines may include a first amplifier configured to selectively output first data voltages to first pixel driving circuits connected to the first data line and to second pixel driving circuits connected to the second data line and second amplifiers configured to output third data voltages to third pixel driving circuits connected to the third data lines.

In an embodiment, the first amplifier may be configured to alternately output the first data voltages to the pixel driving circuits connected to the first data line and the second data voltages to the pixel driving circuits connected to the second data line.

In an embodiment, the first amplifier may be configured to output the first data voltages to the first data line and the second data voltages to the second data line in response to a first clock signal and to output the third data voltages to at least one third data line among the third data lines in response to a second clock signal.

In an embodiment, the second clock signal may have a phase that is opposite to a phase of the first clock signal.

In an embodiment, each of the second amplifiers may be configured to output data voltages to at least one third data line in response to a first clock signal and to output data voltages to at least another third data line in response to a second clock signal.

Therefore, a display device according to embodiments may include an amplifier capable of outputting data voltages to a plurality of data lines, so that the number of amplifiers included in a data driver can be reduced. Accordingly, an area occupied by the data driver can be reduced, so that a dead space can be reduced, and a manufacturing cost can be reduced.

In addition, according to the display device, each of data lines may be connected to pixel driving circuits, which are configured to drive light emitting elements configured to display the same color, so that power consumption for charging/discharging of each of the data lines can be reduced.

However, the effect of the present disclosure is not limited thereto. Thus, the effect of the present disclosure may be extended without departing from the spirit and the scope of the present disclosure.

DETAILED DESCRIPTION OF THE EMBODIMENTS

Hereinafter, embodiments of the present disclosure will be explained in detail with reference to the accompanying drawings.

Figure 1:
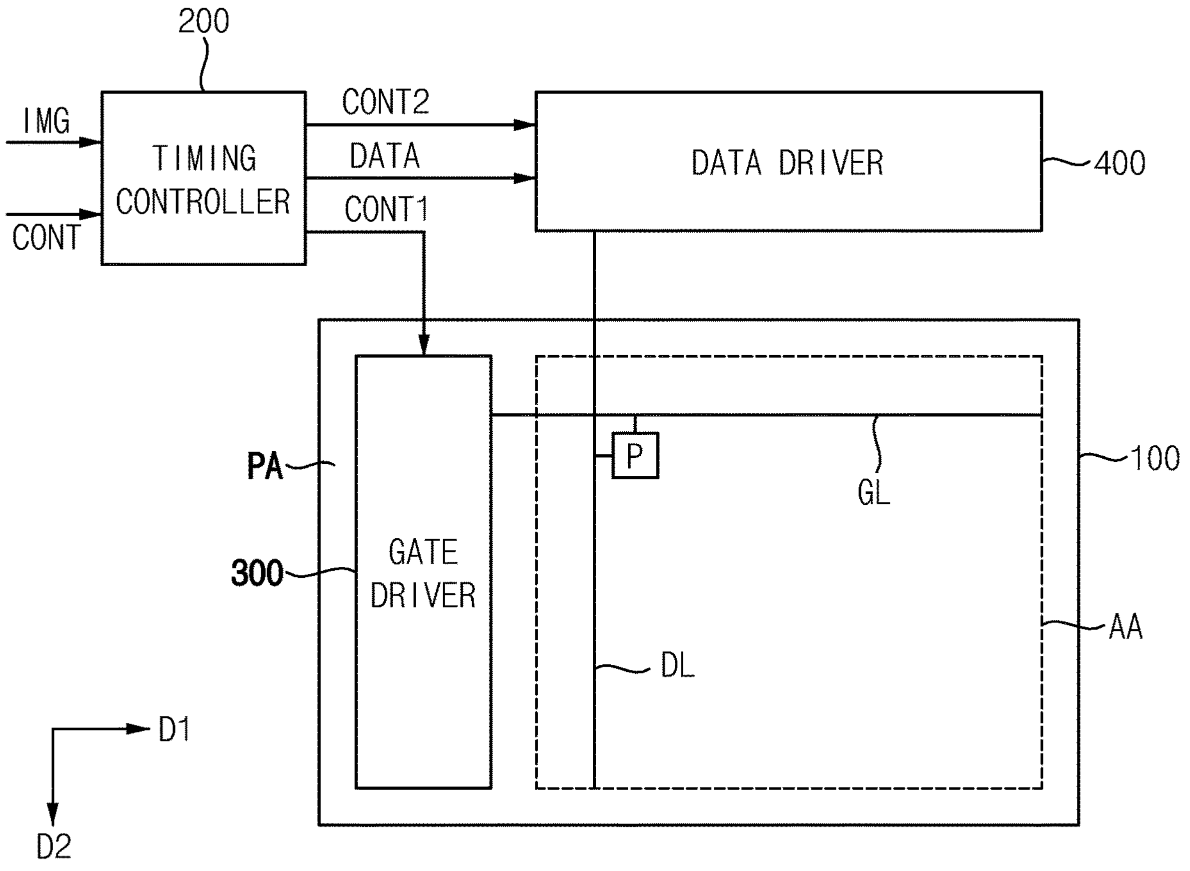
FIG. 1 is a block diagram showing a display device according to embodiments of the present disclosure.

FIG. 1 is a block diagram showing a display device according to embodiments of the present disclosure.

Referring to FIG. 1, a display device may include a display panel 100, a timing controller 200, a gate driver 300, and a data driver 400. According to one embodiment, the timing controller 200 and the data driver 400 may be integrated into one chip.

The display panel 100 may include a display part AA configured to display an image, and a peripheral part PA disposed adjacent to the display part AA. According to one embodiment, the gate driver 300 may be mounted on the peripheral part PA.

The display panel 100 may include a plurality of gate lines GL, a plurality of data lines DL, and a plurality of pixels P electrically connected to the gate lines GL and the data lines DL. The gate lines GL may extend in a first direction D1 and the data lines DL may extend in a second direction D2 intersecting the first direction D1.

The timing controller 200 may receive input image data IMG and an input control signal CONT from a main processor (e.g., a graphic processing unit (GPU), etc.). For example, the input image data IMG may include red image data, green image data, and blue image data. According to one embodiment, the input image data IMG may further include white image data. As another example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The timing controller 200 may generate a first control signal CONT1, a second control signal CONT2, and a data signal DATA based on the input image data IMG and the input control signal CONT.

The timing controller 200 may generate the first control signal CONT1 for controlling an operation of the gate driver 300 based on the input control signal CONT to output the generated first control signal CONT1 to the gate driver 300. The first control signal CONT1 may include a vertical start signal and a gate clock signal.

The timing controller 200 may generate the second control signal CONT2 for controlling an operation of the data driver 400 based on the input control signal CONT to output the generated second control signal CONT2 to the data driver 400. The second control signal CONT2 may include a horizontal start signal and a load signal.

The timing controller 200 may receive the input image data IMG and the input control signal CONT to generate the data signal DATA. The timing controller 200 may output the data signal DATA to the data driver 400.

The gate driver 300 may generate gate signals for driving the gate lines GL in response to the first control signal CONT1 received from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may generate data voltages obtained by converting the data signal DATA into an analog voltage. The data driver 400 may output the data voltages to the data lines DL.

Figure 2:
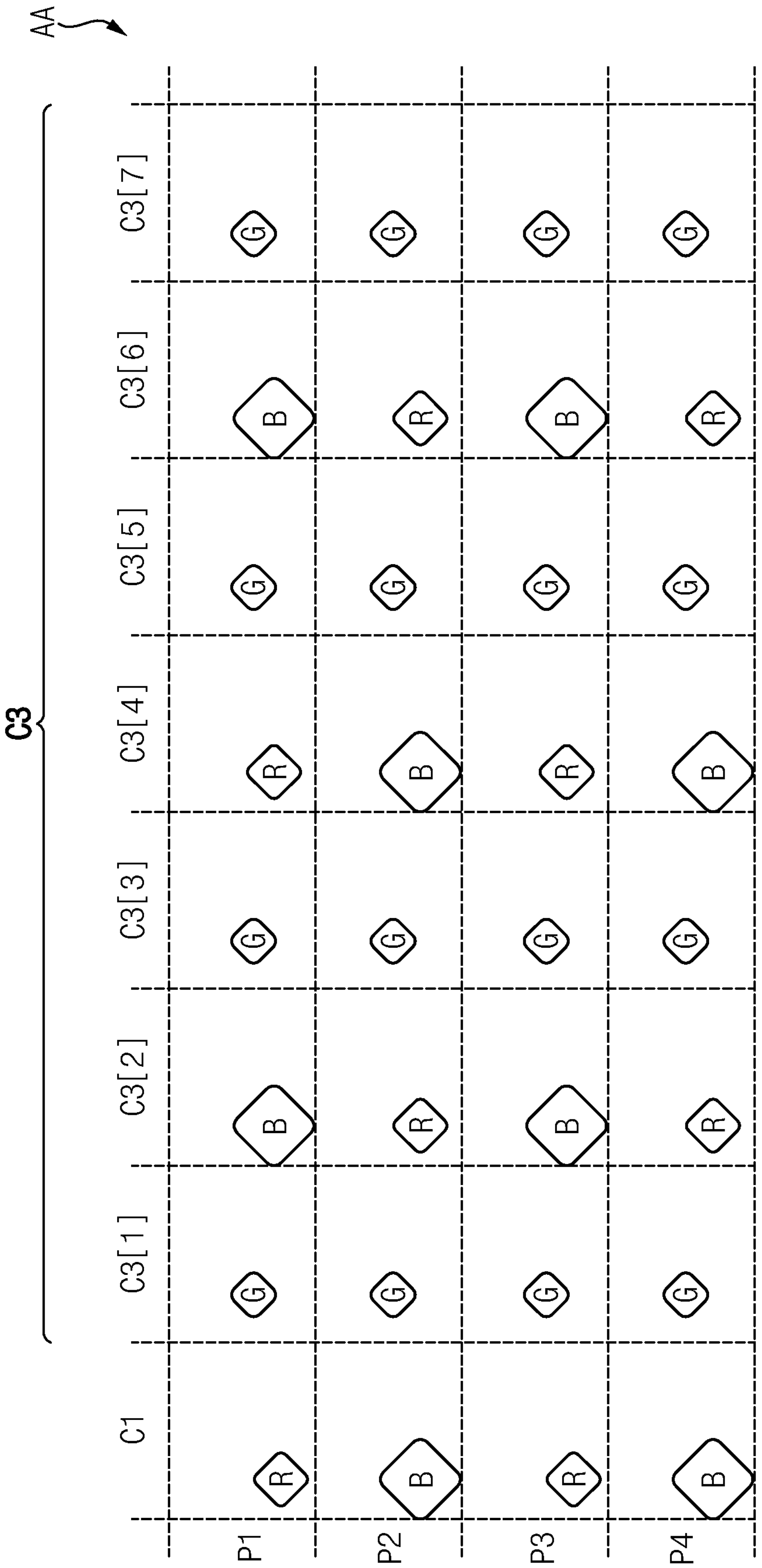
FIG. 2 is a view showing one example of light emitting elements disposed in a display part of the display device of FIG. 1.
Figure 3:
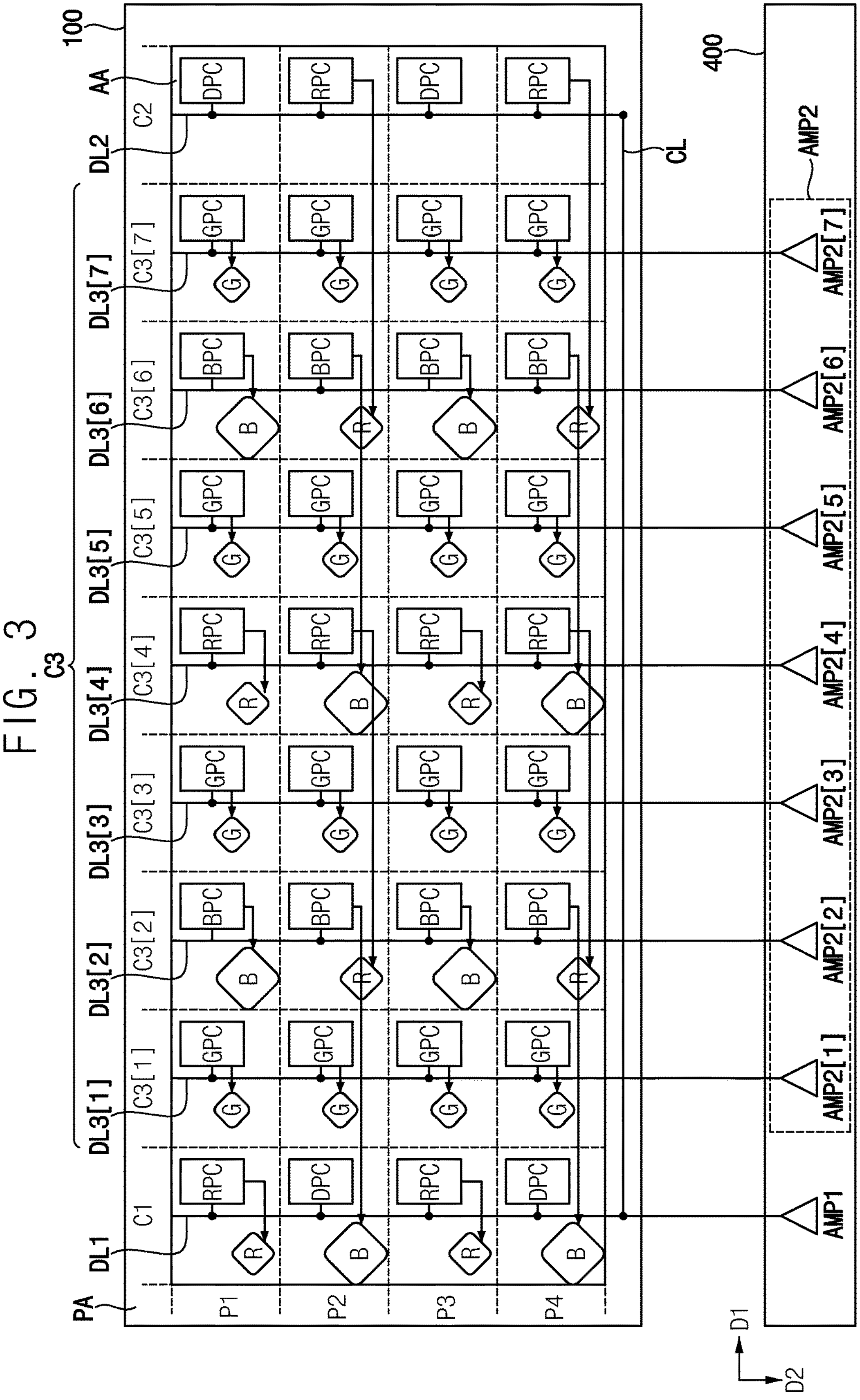
FIG. 3 is a view showing one example of a display panel and a data driver of the display device of FIG. 1.
Figure 4:
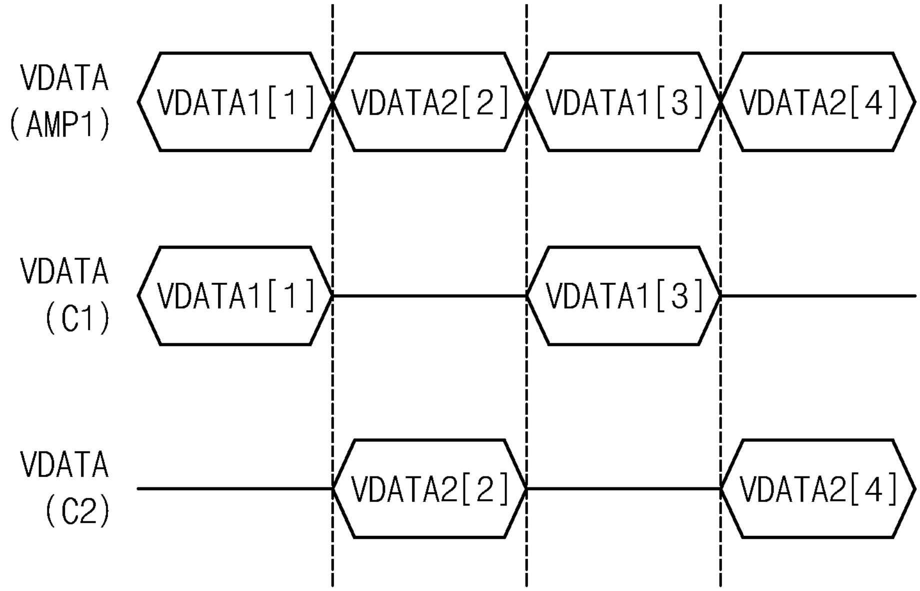
FIG. 4 is a view showing one example of data voltages output from a first amplifier in FIG. 3.

FIG. 2 is a view showing one example of light emitting elements R, G, and B disposed in a display part AA of the display device of FIG. 1, FIG. 3 is a view showing one example of a display panel 100 and a data driver 400 of the display device of FIG. 1, and FIG. 4 is a view showing one example of data voltages VDATA output from a first amplifier AMP1 in FIG. 3.

In FIGS. 2 and 3, P1, P2, P3, and P4 represent rows, and C1, C3[1], C3[2], C3[3], C3[4], C3[5], C3[6], C3[7], and C2 represent columns. In FIG. 3, the gate lines GL will be omitted for convenience of description.

Referring to FIGS. 1 to 3, each of the pixels P may include light emitting elements R, G, and B and pixel driving circuits RPC, GPC, and BPC. The pixel driving circuits RPC, GPC, and BPC may drive the light emitting elements R, G, and B, and the light emitting elements R, G, and B may emit lights.

The light emitting elements R, G, and B may include: a first color light emitting element R configured to display a first color; a second color light emitting element G configured to display a second color; and a third color light emitting element B configured to display a third color. For example, the first color may be a red color, the second color may be a green color, and the third color may be a blue color.

The pixel driving circuits RPC, GPC, and BPC may include: a first color pixel driving circuit RPC configured to drive the first color light emitting element R; a second color pixel driving circuit GPC configured to drive the second color light emitting element G; and a third color pixel driving circuit BPC configured to drive the third color light emitting element B.

As shown in FIG. 2, in order to increase a resolution of a display screen, the light emitting elements may have an RGBG arrangement in which two adjacent light emitting element groups (or unit light emitting elements) share the first color light emitting element R and/or the third color light emitting element B. According to the light emitting elements having the RGBG arrangement, each of the light emitting element groups (or each of the unit light emitting elements) may have two light emitting elements, for example, the first color light emitting element R and the second color light emitting element G or the third color light emitting element B and the second color light emitting element G so that a unit pixel size may be reduced, and thus a resolution of the display device may be increased.

Although the RGBG arrangement has been illustrated in the present embodiment, the present disclosure is not limited thereto. For example, the light emitting elements R, G, and B may have one of arrangements in which the light emitting elements R, G, and B having mutually different colors are arranged in one column.

As shown in FIG. 3, each of the data lines DL may be connected to the pixel driving circuits which are configured to drive the light emitting elements configured to display the same color.

For example, a first data line DL1 may be connected to the first color pixel driving circuits RPC. For example, a second data line DL2 may be connected to the first color pixel driving circuits RPC. For example, a part of third data lines DL3[4] may be connected to the first color pixel driving circuits RPC. For example, a part of the third data lines DL3[1], DL3[3], DL3[5], and DL3 [7] may be connected to the second color pixel driving circuits GPC. For example, a part of the third data lines DL3[2] and DL3[6] may be connected to the third color pixel driving circuits BPC.

Although the second data line DL2 has been illustrated in the present embodiment as being connected to the first color pixel driving circuits RPC, the present disclosure is not limited thereto. For example, depending on an arrangement and the number of the light emitting elements R, G, and B, the second data line DL2 may be connected to the third color pixel driving circuits BPC.

According to the display device, each of the data lines DL may be connected to the pixel driving circuits which are configured to drive the light emitting elements configured to display the same color so that power consumption for charging/discharging of each of the data lines DL may be reduced.

The RGBG arrangement may be configured such that the light emitting elements R, G, and B having mutually different colors, for example, the first color light emitting elements R and the third color light emitting elements B, are alternately arranged in one column. Therefore, in order for each of the data lines DL to be connected to the pixel driving circuits which are configured to drive the light emitting elements configured to display the same color, some of the pixel driving circuits may drive the light emitting elements in a column that is different from the column in which the pixel driving circuits are disposed.

According to one embodiment, the pixel driving circuits RPC, GPC, and BPC may be connected to the light emitting elements R, G, and B disposed in one side of the pixel driving circuits RPC, GPC, and BPC along the first direction D1. A first part of third columns, for example, C3[2], C3[4], and C3[6] may include the first color light emitting elements R and the third color light emitting elements B alternatingly disposed along the second direction D2 crossing the first direction D1. The first part of the third columns may include the first color pixel driving circuits RPC or the third color pixel driving circuits BPC. At least one of the first or third color pixel driving circuits RPC or BPC of the first part may drive the first or third color light emitting elements R or B in a column that is different from the column in which the pixel driving circuits are disposed.

For example, the third color pixel driving circuit BPC in a P1 row and a C3[2] column may drive the third color light emitting element B in the P1 row and the C3[2] column. The third color pixel driving circuit BPC in a P2 row and the C3[2] column may drive the third color light emitting element B in the P2 row and a C1 column. The third color pixel driving circuit BPC in a P3 row and the C3[2] column may drive the third color light emitting element B in the P3 row and the C3[2] column. The third color pixel driving circuit BPC in a P4 row and the C3[2] column may drive the third color light emitting element B in the P4 row and the C1 column.

For example, the first color pixel driving circuit RPC in the P1 row and a C3[4] column may drive the first color light emitting element R in the P1 row and the C3[4] column. The first color pixel driving circuit RPC in the P2 row and the C3[4] column may drive the first color light emitting element R in the P2 row and the C3[2] column. The first color pixel driving circuit RPC in the P3 row and the C3[4] column may drive the first color light emitting element R in the P3 row and the C3[4] column. The first color pixel driving circuit RPC in the P4 row and the C3[4] column may drive the first color light emitting element R in the P4 row and the C3[2] column.

According to one embodiment, the pixel driving circuits RPC, GPC, and BPC may be connected to the light emitting elements R, G, and B disposed on one side of the pixel driving circuits RPC, GPC, and BPC in the first direction D1. A second part of the third columns, for example, C3[1], C3[3], C3[5], and C3[7] may include the second color light emitting elements G. The second part may include the second color pixel driving circuits GPC. The second color pixel driving circuits GPC of the second part may drive the second color light emitting elements G in a column in which the second color pixel driving circuits GPC are disposed.

For example, the second color pixel driving circuit GPC in the P1 row and a C3[1] column may drive the second color light emitting element G in the P1 row and the C3[1] column. The second color pixel driving circuit GPC in the P2 row and the C3[1] column may drive the second color light emitting element G in the P2 row and the C3[1] column. The second color pixel driving circuit GPC in the P3 row and the C3[1] column may drive the second color light emitting element G in the P3 row and the C3[1] column. The second color pixel driving circuit GPC in the P4 row and the C3[1] column may drive the second color light emitting element G in the P4 row and the C3[1] column.

The pixel driving circuits RPC arranged in a first column C1 may drive the light emitting elements R arranged in the first column C1, and the pixel driving circuits RPC arranged in a second column C2 may drive the light emitting elements R arranged in at least one of the third columns C3.

According to one embodiment, the pixel driving circuits RPC, GPC, and BPC may be connected to the light emitting elements R, G, and B disposed on one side of the pixel driving circuits RPC, GPC, and BPC in the first direction D1. The first column C1 may include the first color light emitting elements R and the third color light emitting elements B. The first column C1 may include the first color pixel driving circuits RPC. The first color pixel driving circuits RPC of the first column C1 may drive the first color light emitting elements R of the first column C1. However, since the pixel driving circuits RPC, GPC, and BPC are connected to the light emitting elements R, G, and B disposed on one side of the pixel driving circuits RPC, GPC, and BPC in the first direction D1, and the first column C1 is disposed furthermost in a direction opposite to the first direction D1, the first column C1 may include dummy pixel driving circuits DPC.

The dummy pixel driving circuits DPC may have substantially the same structure as the pixel driving circuits RPC, GPC, and BPC, but may not drive the light emitting elements R, G, and B. According to one embodiment, the spaces for the dummy pixel driving circuits DPC may be empty spaces in which no pixel driving circuit is disposed or include other circuits without including the dummy pixel driving circuits DPC.

For example, the first column C1 may include the first color pixel driving circuits RPC in the P1 row and the P3 row. The first color pixel driving circuit RPC in the P1 row and the C1 column may drive the first color light emitting element R in the P1 row and the C1 column. The first color pixel driving circuit RPC in the P3 row and the C1 column may drive the first color light emitting element R in the P3 row and the C1 column.

According to one embodiment, the pixel driving circuits RPC, GPC, and BPC may be connected to the light emitting elements R, G, and B disposed on the one side of the pixel driving circuits RPC, GPC, and BPC in the first direction D1. The second column C2 may include the first color pixel driving circuits RPC. However, since the pixel driving circuits RPC, GPC, and BPC are connected to the light emitting elements R, G, and B disposed on the one side of the pixel driving circuits RPC, GPC, and BPC in the first direction D1, and the second column C2 is disposed furthermost in the first direction D1, the second column C2 may include the dummy pixel driving circuits DPC, and the light emitting elements R, G, and B may not be disposed in the second column C2.

The dummy pixel driving circuits DPC may have substantially the same structure as the pixel driving circuits RPC, GPC, and BPC, but may not drive the light emitting elements R, G, and B. According to one embodiment, the spaces for the dummy pixel driving circuits DPC may be empty spaces in which no pixel driving circuit is disposed or include other circuits without including the dummy pixel driving circuits DPC.

For example, the second column C2 may include the first color pixel driving circuits RPC in the P2 row and the P4 row. The first color pixel driving circuit RPC in the P2 row and a C2 column may drive the first color light emitting element R in the P2 row and a C3[6] column. The first color pixel driving circuit RPC in the P4 row and the C2 column may drive the first color light emitting element R in the P4 row and the C3[6] column.

Although the second column C2 has been illustrated in the present embodiment as including the first color pixel driving circuits RPC, the present disclosure is not limited thereto. For example, depending on the arrangement and the number of the light emitting elements R, G, and B, the second column C2 may include the third color pixel driving circuits BPC.

Although 32 light emitting elements R, G, and B and 32 pixel driving circuits RPC, GPC, and BPC have been illustrated in the present embodiment, the present disclosure is not limited to the number of the light emitting elements R, G, and B and the pixel driving circuits RPC, GPC, and BPC. Similarly, the present disclosure is not limited to the number of rows and columns.

Referring to FIGS. 1 to 4, the data driver 400 may include: a first amplifier AMP1 configured to output the data voltages VDATA to a first data line DL1 connected to the pixel driving circuits RPC, GPC, and BPC arranged in a first column C1 and a second data line DL2 connected to the pixel driving circuits RPC, GPC, and BPC arranged in a second column C2; and second amplifiers AMP2 configured to output the data voltages VDATA to third data lines DL3[1], DL3[2], . . . , and DL3[7] connected to the pixel driving circuits RPC, GPC, and BPC arranged in third columns C3, which are disposed adjacent to the first column C1 in a first direction D1 and adjacent to the second column C2 in a direction opposite to the first direction D1.

According to one embodiment, the first amplifier AMP1 may selectively output the data voltages VDATA to the pixel driving circuits RPC connected to the first data line DL1 and the pixel driving circuits RPC connected to the second data line DL2. The first amplifier AMP1 may alternately output the data voltages VDATA to the pixel driving circuits RPC connected to the first data line DL1 and the pixel driving circuits RPC connected to the second data line DL2.

For example, the display device may sequentially drive the pixel driving circuits RPC, GPC, and BPC one row P1, P2, P3, or P4 at a time. When the P1 row is driven, the first amplifier AMP1 may output the data voltage (i.e., VDATA1[1]) to the first color pixel driving circuit RPC in the P1 row and the C1 column connected to the first data line DL1. When the P2 row is driven, the first amplifier AMP1 may output the data voltage (i.e., VDATA2[2]) to the first color pixel driving circuit RPC in the P2 row and the C2 column connected to the second data line DL2. When the P3 row is driven, the first amplifier AMP1 may output the data voltage (i.e., VDATA1[3]) to the first color pixel driving circuit RPC in the P3 row and the C1 column connected to the first data line DL1. When the P4 row is driven, the first amplifier AMP1 may output the data voltage (i.e., VDATA2[4]) to the first color pixel driving circuit RPC in the P4 row and the C2 column connected to the second data line DL2.

According to one embodiment, information on an output order of the first amplifier AMP1 may be included in the second control signal CONT2. According to one embodiment, the output order of the first amplifier AMP1 may be implemented through circuits inside the data driver 400.

The display device may include an amplifier (i.e., the first amplifier AMP1) capable of outputting data voltages VDATA to a plurality of data lines DL so that the number of amplifiers AMP1 and AMP2 included in the data driver 400 may be reduced. Accordingly, an area occupied by the data driver 400 may be reduced, so that a dead space may be reduced, and a manufacturing cost may be reduced.

According to one embodiment, the timing controller 200 may compensate for a difference in load between the first amplifier AMP1 and the second amplifier AMP2. Unlike the second amplifier AMP2, the first amplifier AMP1 may be connected to two data lines (i.e., DL1 and DL2), so that a load of the first amplifier AMP1 and a load of the second amplifier AMP2 may be different from each other. Therefore, the timing controller 200 may compensate for the input image data IMG to compensate for the difference in load between the first amplifier AMP1 and the second amplifier AMP2.

The first data line DL1 and the second data line DL2 may be connected to each other through a connection line CL, and the first amplifier AMP1 may be connected to the connection line CL. In other words, the first amplifier AMP1 may output the data voltages VDATA to both the first data line DL1 and the second data line DL2 through the connection line CL.

According to one embodiment, the connection line CL may be disposed in the peripheral part PA of the display panel 100. According to one embodiment, the first amplifier AMP1 and the second amplifier AMP2 may be disposed adjacent to the display panel 100 in the second direction D2, and the connection line CL may be disposed adjacent to the display part AA in the second direction D2.

Figure 5:
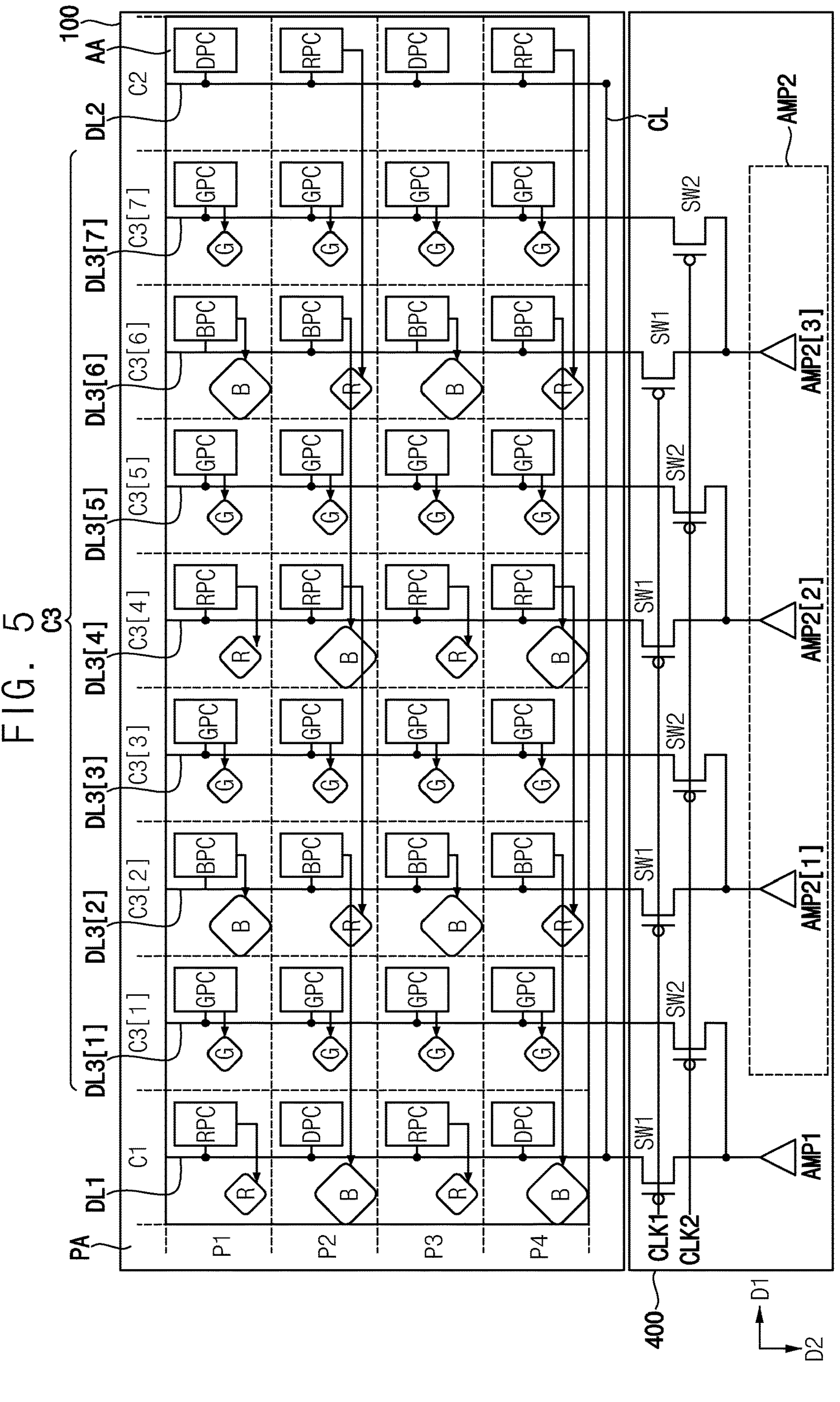
FIG. 5 is a view showing a display panel and a data driver of a display device according to embodiments of the present disclosure.
Figure 6:
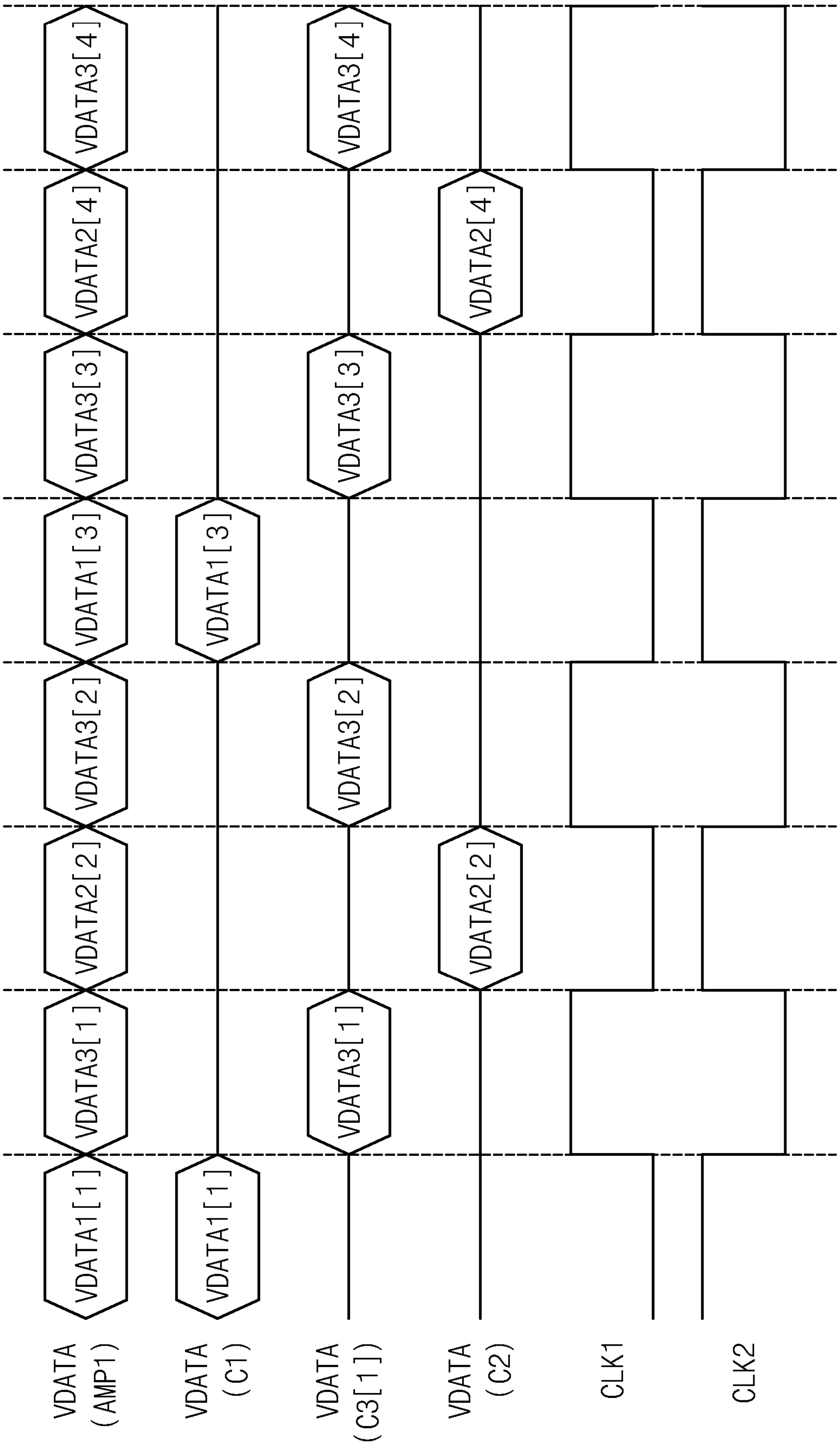
FIG. 6 is a view showing one example of data voltages output from amplifiers in FIG. 5.

FIG. 5 is a view showing a display panel 100 and a data driver 400 of a display device according to embodiments of the present disclosure, and FIG. 6 is a view showing one example of data voltages VDATA output from amplifiers AMP1 and AMP2 in FIG. 5.

In FIGS. 5, P1, P2, P3, and P4 represent rows, and C1, C3[1], C3[2], C3[3], C3[4], C3[5], C3[6], C3[7], and C2 represent columns. In FIG. 5, the gate lines GL will be omitted for convenience of description.

Since a display device according to the present embodiments has a configuration that is substantially identical to the configuration of the display device of FIG. 1 except for the connection between the amplifiers AMP1 and AMP2 and the data lines DL, the same reference numbers and reference signs will be used for the same or similar components, and redundant descriptions will be omitted.

Referring to FIGS. 1, 5, and 6, the first amplifier AMP1 may output the data voltages VDATA to the first data line DL1 and the second data line DL2 in response to a first clock signal CLK1, and may output the data voltages VDATA to at least one third data line (e.g., DL3[1]) among the third data lines DL3[1], DL3[2], . . . , and DL3[7] in response to a second clock signal CLK2.

Each of the second amplifiers AMP2 may output the data voltages VDATA to at least one of the third data lines, for example, one of the DL3[2], DL3[4], . . . , or DL3[6], among the third data lines DL3[1], DL3[2], . . . , and DL3[7] in response to a first clock signal CLK1, and may output the data voltages VDATA to at least the other of the third data lines, for example, one of the DL3[3], DL3[5], . . . , and DL3[7], among the third data lines DL3[1], DL3[2], . . . , and DL3[7] in response to a second clock signal CLK2.

According to one embodiment, the data driver 400 may include a first switches SW1 that is turned on in response to the first clock signal CLK1, and a second switches SW2 that is turned on in response to the second clock signal CLK2. For example, the first switches SW1 and the second switches SW2 may be P-type transistors. In this case, the first switches SW1 and the second switches SW2 may be turned on in response to the first clock signal CLK1 or the second clock signal CLK2 having a low voltage level. However, the first switches SW1 and the second switches SW2 are not limited to the P-type transistors.

For example, the first amplifier AMP1 may output the data voltages VDATA (e.g., VDATA1[1], VDATA2[2], VDATA1[3], and VDATA2[4]) to the first data line DL1 and the second data line DL2 in response to the first clock signal CLK1 having the low voltage level. The first amplifier AMP1 may output the data voltages VDATA (e.g., VDATA3[1], VDATA3[2], VDATA3[3], and VDATA3[4]) to the third data line DL3[1] of the C3[1] column in response to the second clock signal CLK2 having the low voltage level.

For example, the second amplifier AMP2[1] of AMP2 may output the data voltages VDATA to the third data line DL3[2] in the C3[2] column in response to the first clock signal CLK1 having the low voltage level. The second amplifier AMP2[1] of AMP2 may output the data voltages to the third data line DL3[3] in a C3[3] column in response to the second clock signal CLK2 having the low voltage level.

According to one embodiment, the second clock signal CLK2 may have a phase that is opposite to a phase of the first clock signal CLK1. For example, the first amplifier AMP1 may not output the data voltages VDATA to the third data lines DL3[1], DL3[2], . . . , and DL3[7] while the first amplifier AMP1 outputs the data voltages VDATA to the first data line DL1 and the second data line DL2, and the first amplifier AMP1 may not output the data voltages VDATA to the first data line DL1 and the second data line DL2 while the first amplifier AMP1 outputs the data voltages VDATA to the third data lines DL3.

The first amplifier AMP1 may selectively output the data voltages VDATA to the pixel driving circuits RPC connected to the first data line DL1 and the pixel driving circuits RPC connected to the second data line DL2.

For example, the display device may sequentially drive the pixel driving circuits RPC, GPC, and BPC one row P1, P2, P3, or P4 at a time. When the P1 row is driven, the first amplifier AMP1 may output the data voltage (i.e., VDATA1 [1]) to the first color pixel driving circuit RPC in the P1 row and the C1 column connected to the first data line DL1, and may output the data voltage (i.e., VDATA3[1]) to the second color pixel driving circuit GPC in the P1 row and the C3[1] column connected to the third data line (i.e., DL3[1]). When the P2 row is driven, the first amplifier AMP1 may output the data voltage (i.e., VDATA2[2]) to the first color pixel driving circuit RPC in the P2 row and the C2 column connected to the second data line DL2, and may output the data voltage (i.e., VDATA3[2]) to the second color pixel driving circuit GPC in the P2 row and the C3[1] column connected to the third data line (i.e., DL3[1]). When the P3 row is driven, the first amplifier AMP1 may output the data voltage (i.e., VDATA1[3]) to the first color pixel driving circuit RPC in the P3 row and the C1 column connected to the first data line DL1, and may output the data voltage (i.e., VDATA3[3]) to the second color pixel driving circuit GPC in the P3 row and the C3[1] column connected to the third data line (i.e., DL3[1]). When the P4 row is driven, the first amplifier AMP1 may output the data voltage (i.e., VDATA2[4]) to the first color pixel driving circuit RPC in the P4 row and the C2 column connected to the second data line DL2, and may output the data voltage (i.e., VDATA3[4]) to the second color pixel driving circuit GPC in the P4 row and the C3[1] column connected to the third data line (i.e., DL3[1]).

Although the second amplifier AMP2 connected to two third data lines among the third data lines DL3[1], DL3[2], . . . , and DL3[7] has been illustrated as an example, the number of the third data lines DL3[1], DL3[2], . . . , and DL3[7] connected to the second amplifier AMP2 is not limited thereto. Similarly, the number of the third data lines DL3[1], DL3[2], . . . , and DL3[7] connected to the first amplifier AMP1 is not limited thereto.

Figure 7:
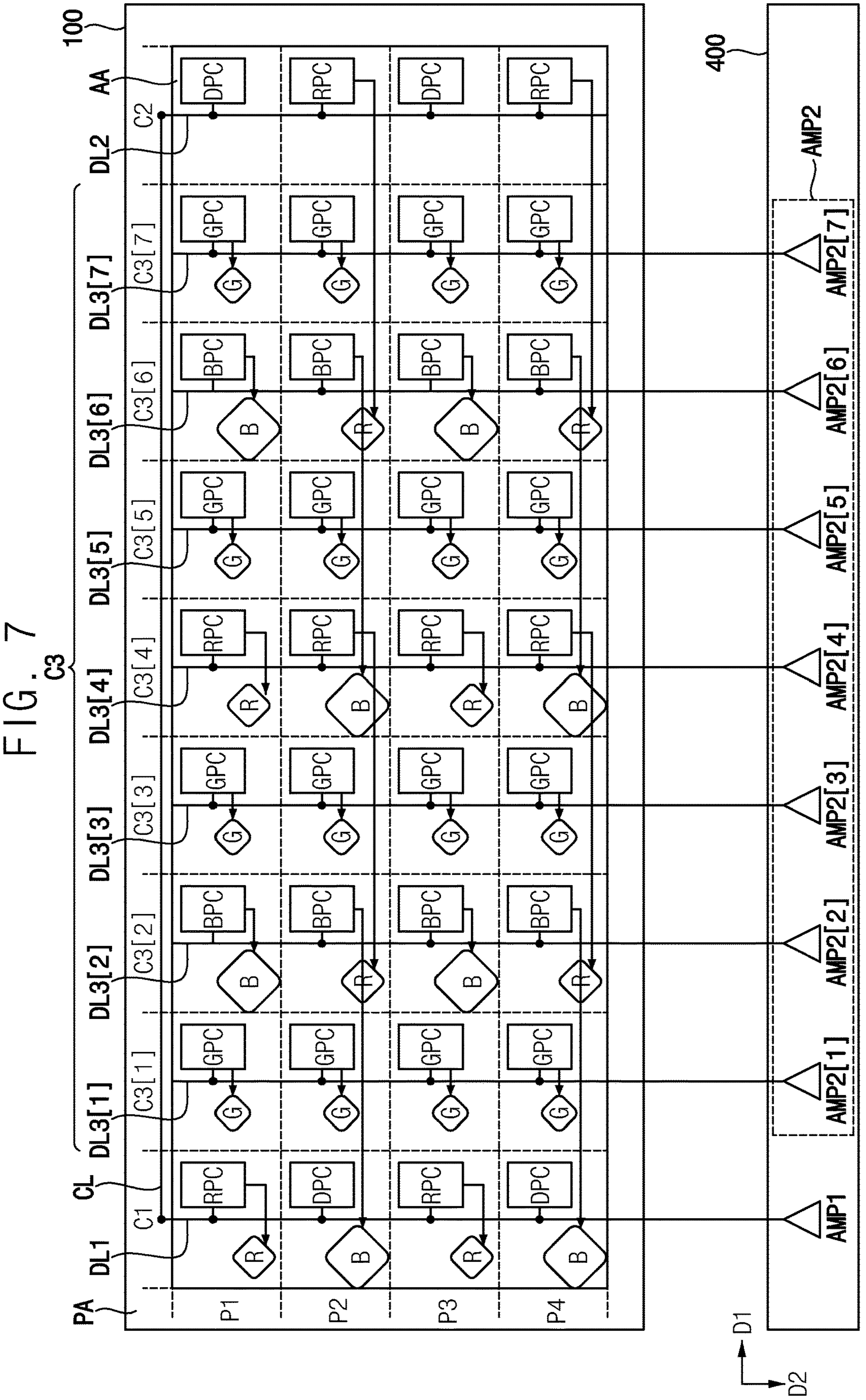
FIGS. 7 and 8 are views showing display panels and data drivers of display devices according to embodiments of the present disclosure.
Figure 8:
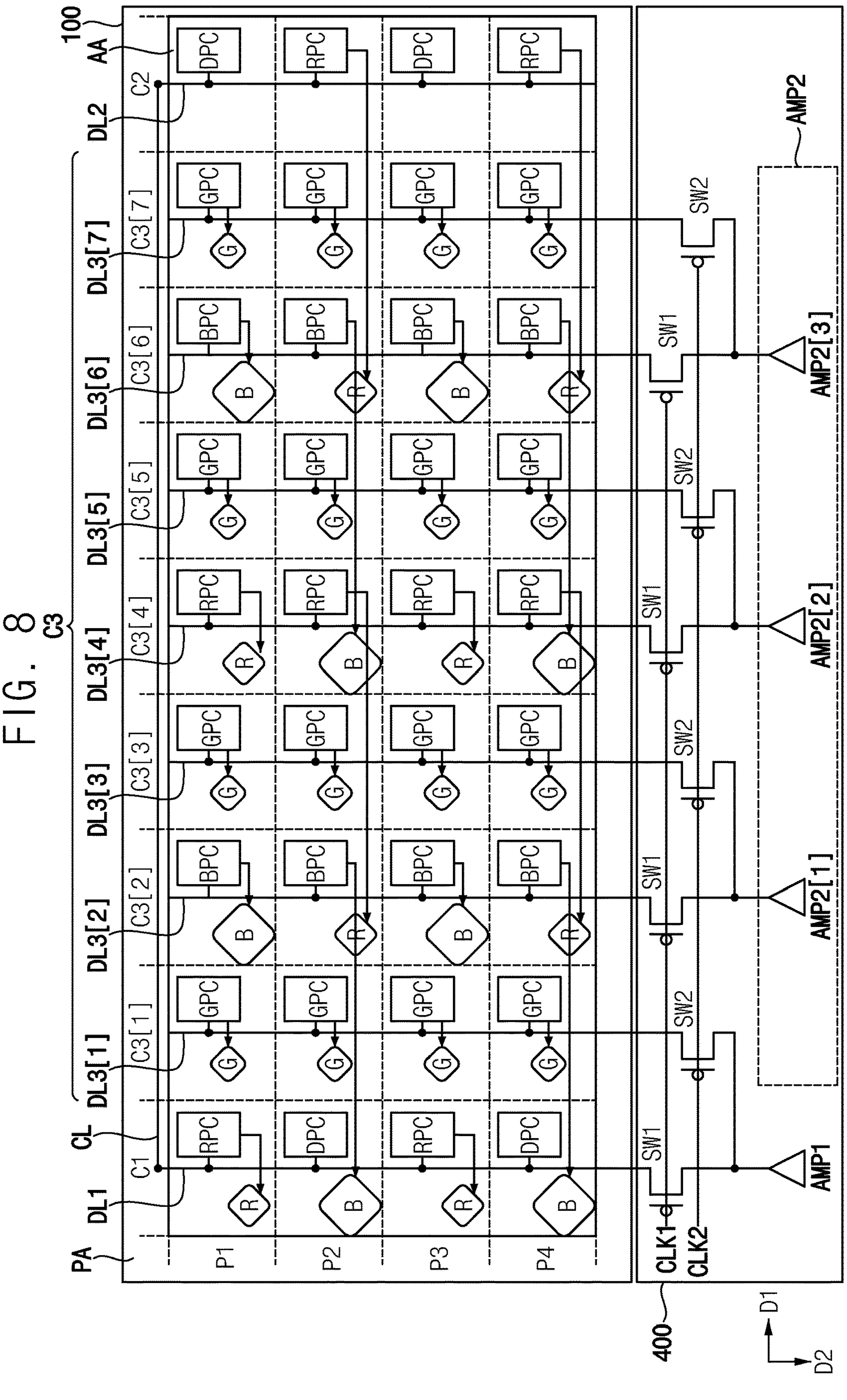

FIGS. 7 and 8 are views showing display panels 100 and data drivers 400 of display devices according to embodiments of the present disclosure.

In FIGS. 7 and 8, P1, P2, P3, and P4 represent rows, and C1, C3[1], C3[2], C3[3], C3[4], C3[5], C3[6], C3[7], and C2 represent columns. In FIGS. 7 and 8, the gate lines GL will be omitted for convenience of description.

Since display devices according to the present embodiments have configurations that are substantially identical to the configurations of the display device of FIGS. 1 and 5 except for the connection line CL, the same reference numbers and reference signs will be used for the same or similar components, and redundant descriptions will be omitted.

Referring to FIGS. 1, 7, and 8, the connection line CL may be disposed in the peripheral part PA. The first amplifier AMP1 and the second amplifiers AMP2 may be disposed adjacent to the display panel 100 in the second direction D2, and the connection line CL may be disposed adjacent to the display part AA in a direction opposite to the second direction D2. Accordingly, overlapping of the connection line CL with other wires (e.g., the data line DL) may be minimized.

Figure 9:
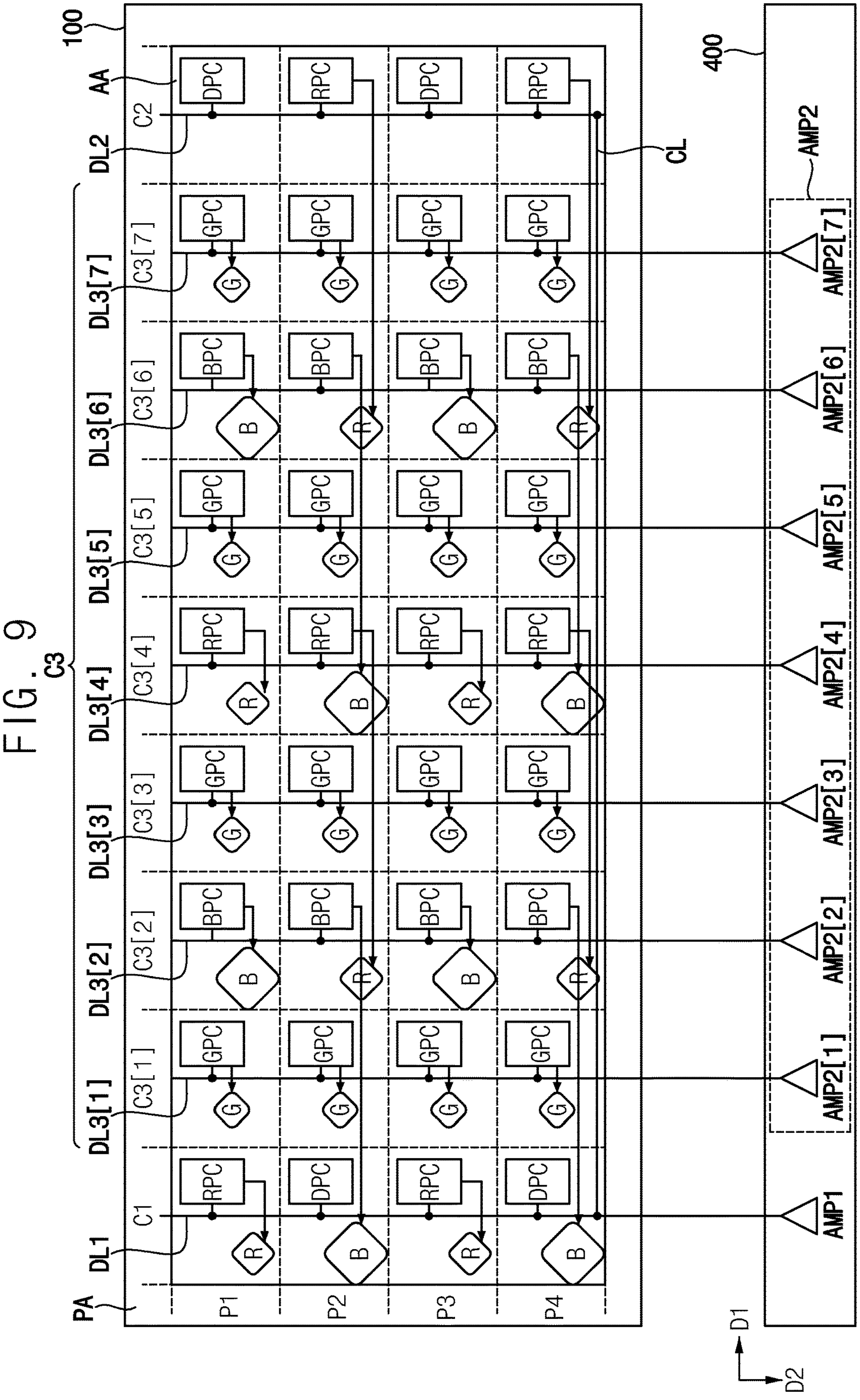
FIGS. 9, 10 and 11 are views showing display panels and data drivers of display devices according to embodiments of the present disclosure.
Figure 10:
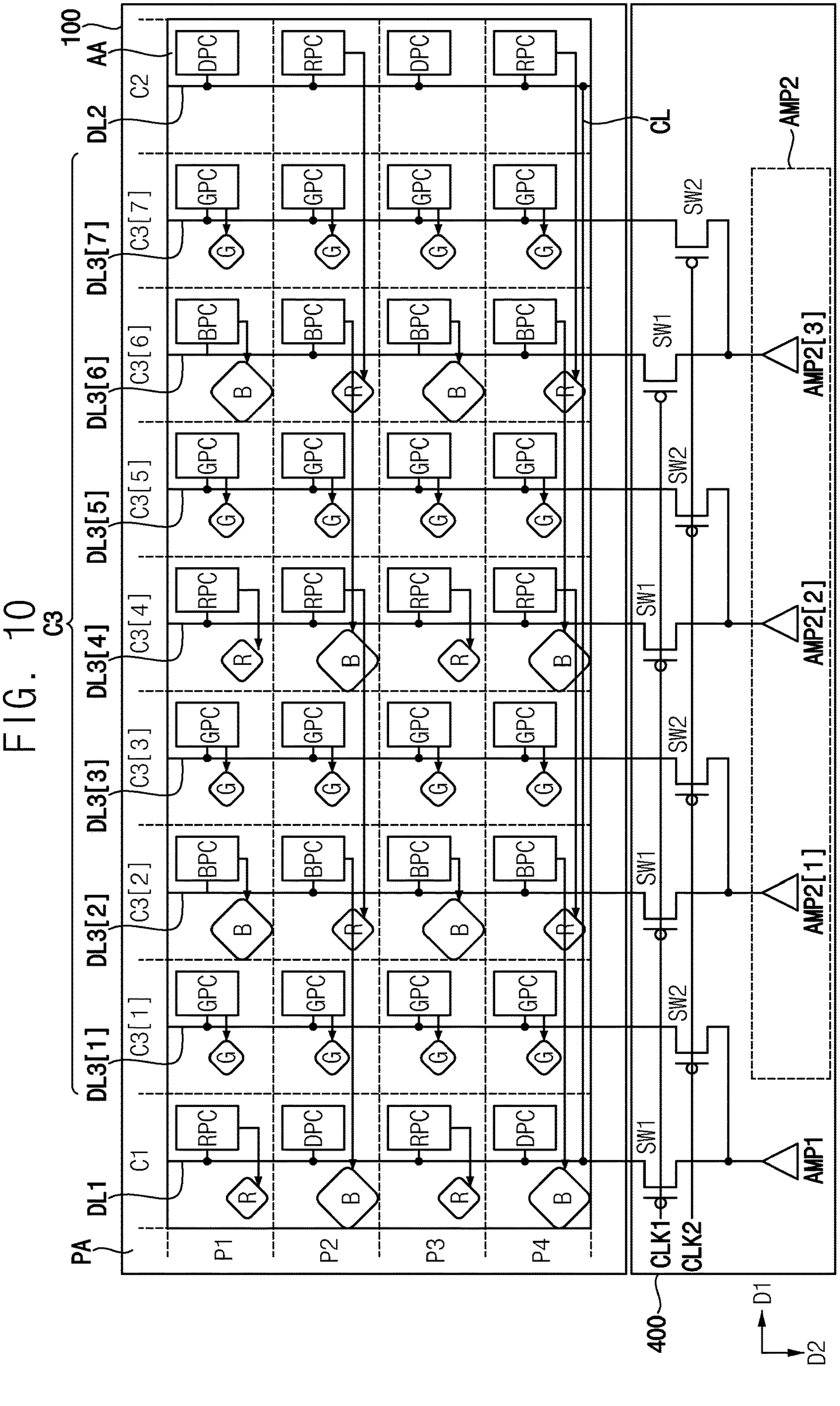
Figure 11:
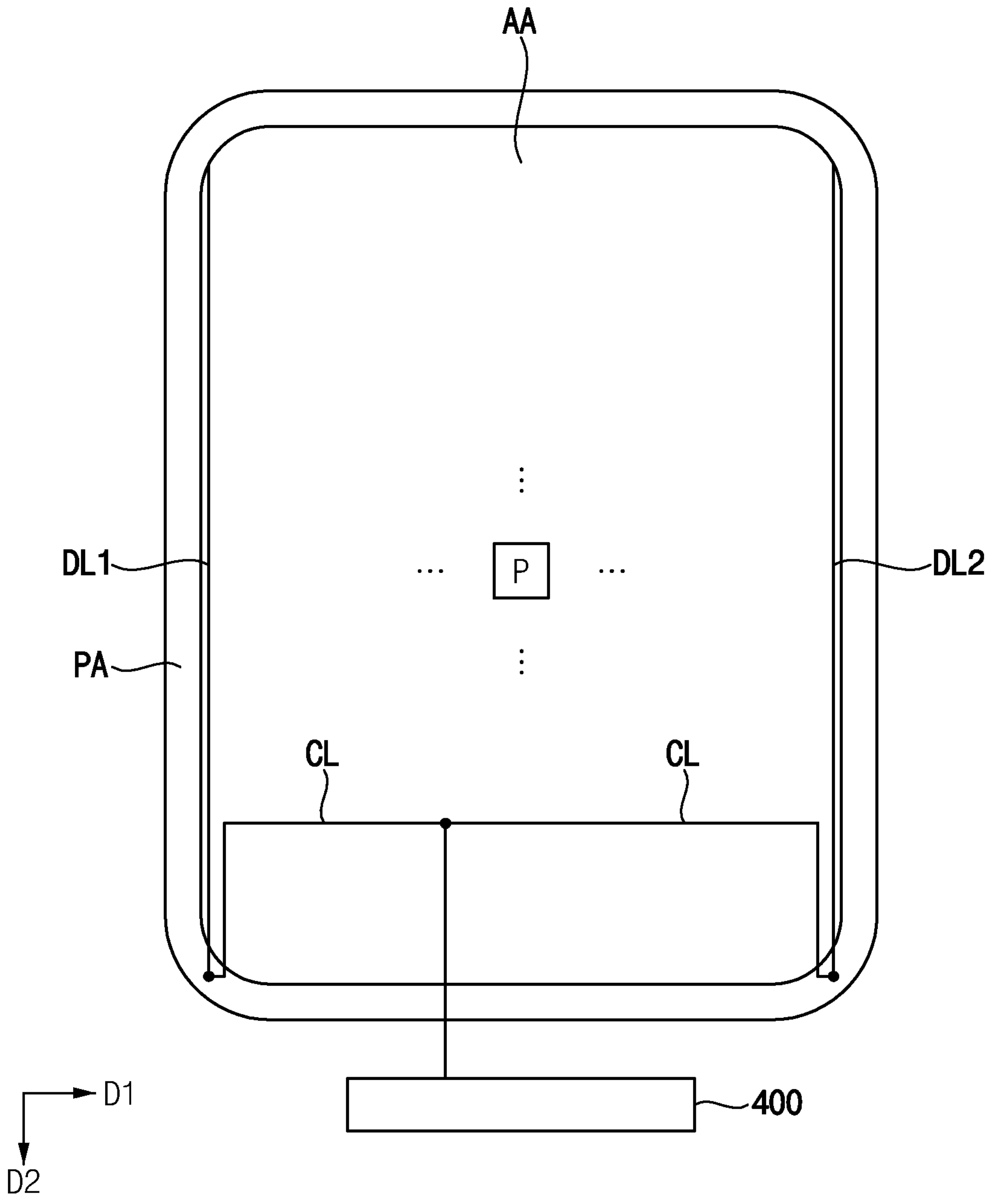

FIGS. 9 to 11 are views showing display panels 100 and data drivers 400 of display devices according to embodiments of the present disclosure.

In FIGS. 9 and 10, P1, P2, P3, and P4 represent rows, and C1, C3[1], C3[2], C3[3], C3[4], C3[5], C3[6], C3[7], and C2 represent columns. In FIGS. 9 and 10, the gate lines GL will be omitted for convenience of description. In FIG. 11, the third data lines DL3[1], DL3[2], . . . , and DL3[7] will be omitted for convenience of description.

Since display devices according to the present embodiments have configurations that are substantially identical to the configurations of the display devices of FIGS. 1 and 5 except for the connection line CL, the same reference numbers and reference signs will be used for the same or similar components, and redundant descriptions will be omitted.

Referring to FIGS. 1, 9, and 10, the connection line CL may be disposed in the display part AA. According to one embodiment, the connection line CL may be disposed on a plane that is different from a plane of the first data line DL1 and the second data line DL2, and may contact the first data line DL1 and the second data line DL2 through a contact hole.

Referring to FIGS. 1 and 11, the data driver 400 may be connected to the first data line DL1 and the second data line DL2 through the connection line CL. The connection line CL may be connected to the first data line DL1 and the second data line DL2 via the display part AA. Since the data driver 400 is connected to the first data line DL1 and the second data line DL2 at both ends of the display part AA through the connection line CL passing through the display part AA a dead space may be reduced.

Figure 12:
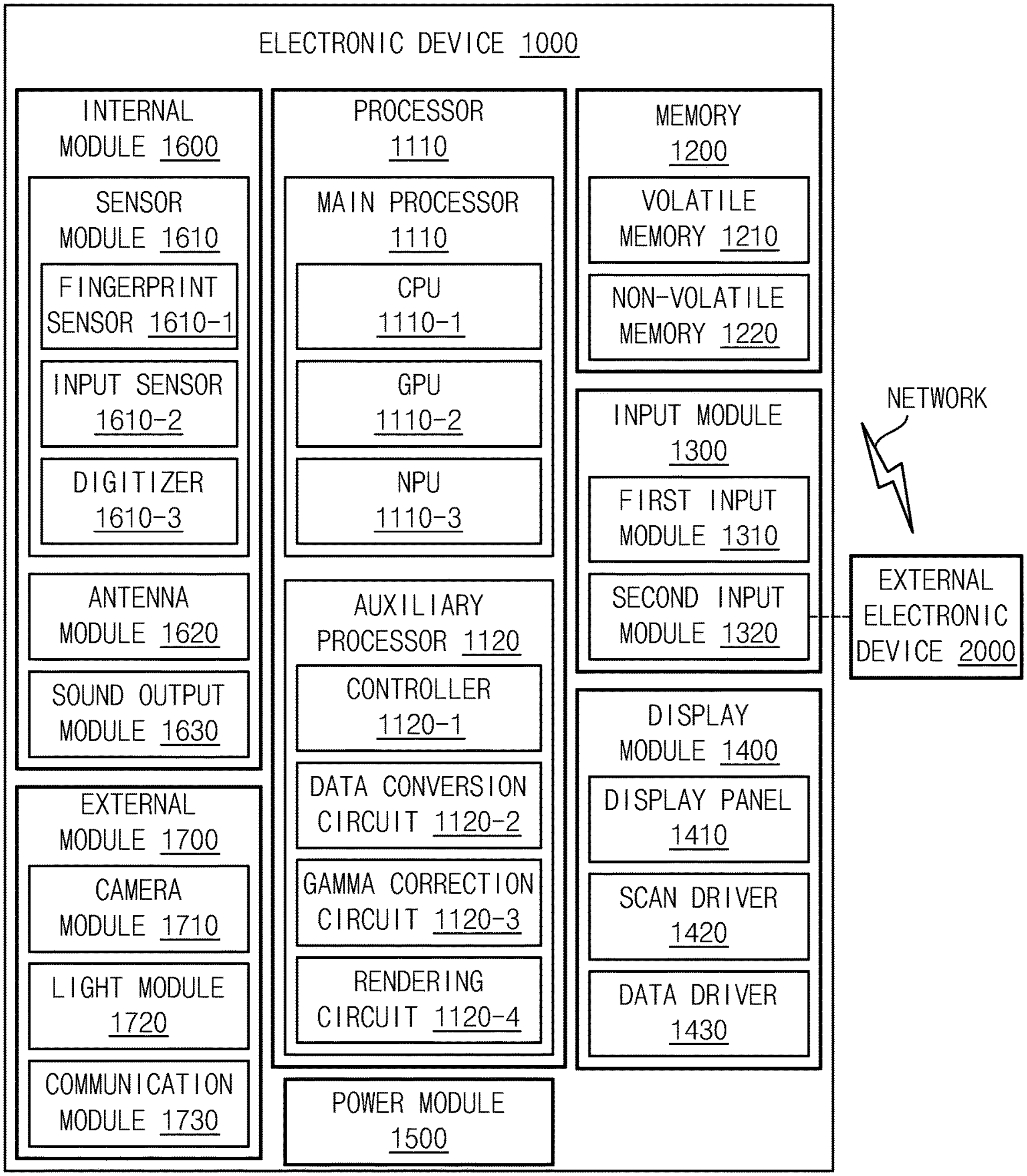
FIG. 12 is a block diagram showing an electronic device according to embodiments of the present disclosure.
Figure 13:
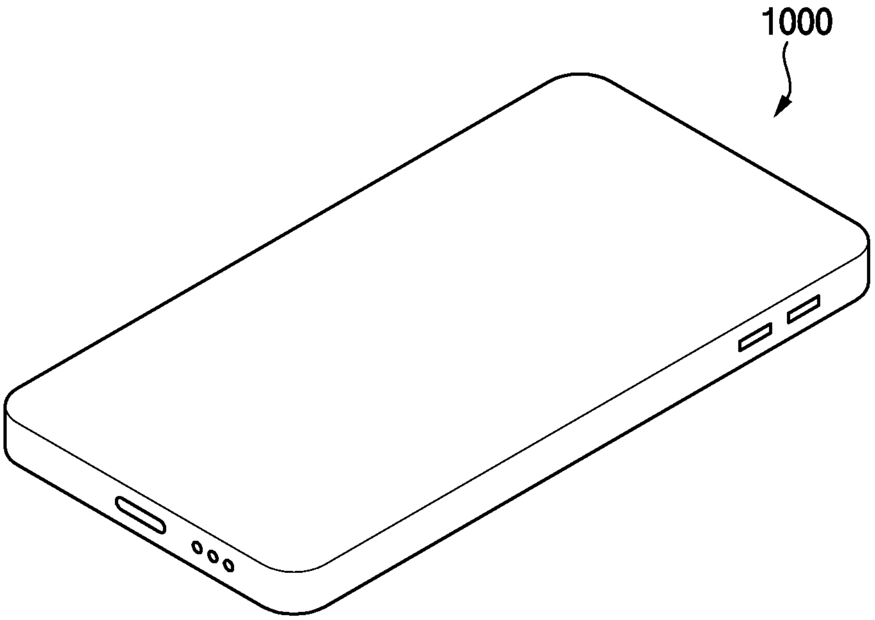
FIG. 13 is a view showing one example in which the electronic device of FIG. 12 is implemented as a smart phone.

FIG. 12 is a block diagram showing an electronic device 1000 according to embodiments of the present disclosure, and FIG. 13 is a view showing one example in which the electronic device 1000 of FIG. 12 is implemented as a smart phone.

Referring to FIGS. 19 and 20, an electronic device 1000 may output various information through a display module 1400 within an operating system. When a processor 1100 executes an application stored in a memory 1200, the display module 1400 may provide application information to a user through a display panel 1410. In this case, the display panel 1410 may be the display panel of FIG. 1.

The processor 1100 may obtain an external input through an input module 1300 or a sensor module 1610, and execute an application corresponding to the external input. For example, when the user selects a camera icon displayed on the display panel 1410, the processor 1100 may obtain a user input through an input sensor 1610-2, and activate a camera module 1710. The processor 1100 may transmit a data signal corresponding to a captured image obtained through the camera module 1710 to the display module 1400. The display module 1400 may display an image corresponding to the captured image through the display panel 1410.

As another example, when personal information authentication is executed in the display module 1400, a fingerprint sensor 1610-1 may obtain fingerprint information, which is input, as input data. The processor 1100 may compare the input data obtained through the fingerprint sensor 1610-1 with authentication data stored in the memory 1200, and execute an application according to a comparison result. The display module 1400 may display information executed according to logic of the application through the display panel 1410.

As still another example, when a music-streaming icon displayed on the display module 1400 is selected, the processor 1100 may obtain the user input through the input sensor 1610-2, and activate a music streaming application stored in the memory 1200. When a music execution command is input in the music streaming application, the processor 1100 may activate a sound output module 1630 to provide sound information corresponding to the music execution command to the user.

An operation of the electronic device 1000 has been briefly described above. Hereinafter, a configuration of the electronic device 1000 will be described in detail. Some of components of the electronic device 1000 that will be described below may be integrated with each other so as to be provided as one component, and one component may be separated into two or more components so as to be provided.

The electronic device 1000 may communicate with an external electronic device 2000 through a network (e.g., a short-range wireless communication network or a long-range wireless communication network). According to one embodiment, the electronic device 1000 may include a processor 1100, a memory 1200, an input module 1300, a display module 1400, a power module 1500, an internal module 1600, and an external module 1700. According to one embodiment, at least one of the components described above may be omitted from the electronic device 1000, or one or more other components may be added to the electronic device 1000. According to one embodiment, some of the components described above (e.g., the sensor module 1610, an antenna module 1620, or the sound output module 1630) may be integrated into another component (e.g., the display module 1400).

The processor 1100 may execute software to control at least one of other components (e.g., hardware or software components) of the electronic device 1000 connected to the processor 1100, and may perform various data processing or calculations. According to one embodiment, as at least portion of the data processing or calculations, the processor 1100 may store a command or data received from another component (e.g., the input module 1300, the sensor module 1610, or a communication module 1730) in a volatile memory 1210, process the command or data stored in the volatile memory 1210, and store result data in a non-volatile memory 1220.

The processor 1100 may include a main processor 1110 and an auxiliary processor 1120. The main processor 1110 may include at least one of a central processing unit (CPU) 1110-1 or an application processor (AP). The main processor 1110 may further include at least one of a graphic processing unit (GPU) 1110-2, a communication processor (CP), and an image signal processor (ISP). The main processor 1110 may further include a neural processing unit (NPU) 1110-3. The neural processing unit may be a processor specialized in processing of an artificial intelligence model, and the artificial intelligence model may be generated through machine learning. The artificial intelligence model may include a plurality of artificial neural network layers. An artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of at least two thereof, but is not limited to the examples described above. The artificial intelligence model may additionally or alternatively include a software structure in addition to a hardware structure. At least two of the processing units and processors described above may be implemented as one integrated component (e.g., a single chip), or may be implemented as independent components (e.g., a plurality of chips), respectively.

The auxiliary processor 1120 may include a controller 1120-1. The controller 1120-1 may include an interface conversion circuit and a timing control circuit. The controller 1120-1 may receive input image data from the main processor 1110, and may convert a data format of the input image data to meet interface specifications with the display module 1400 to output a data signal. The controller 1120-1 may output various control signals required for driving the display module 1400.

The auxiliary processor 1120 may further include a data conversion circuit 1120-2, a gamma correction circuit 1120-3, a rendering circuit 1120-4, and the like. The data conversion circuit 1120-2 may receive the data signal from the controller 1120-1, and may compensate for the data signal to display an image with a desired luminance according to characteristics of the electronic device 1000, settings of the user, or the like, or convert the data signal for reduction of power consumption, afterimage compensation, or the like. The gamma correction circuit 1120-3 may convert the data signal, a gamma reference voltage, or the like so that an image displayed on the electronic device 1000 may have a desired gamma characteristic. The rendering circuit 1120-4 may receive the data signal from the controller 1120-1, and may render the data signal in consideration of a pixel arrangement and the like of the display panel 1410 applied to the electronic device 1000. At least one of the data conversion circuit 1120-2, the gamma correction circuit 1120-3, and the rendering circuit 1120-4 may be integrated into another component (e.g., the main processor 1110 or the controller 1120-1).

At least one of the controller 1120-1, the data conversion circuit 1120-2, the gamma correction circuit 1120-3, and the rendering circuit 1120-4 may be integrated into a data driver 1430 that will be described below.

In this case, the auxiliary processor 1120 may be the timing controller of FIG. 1.

The memory 1200 may store various data used by at least one of the components (e.g., the processor 1100 or the sensor module 1610) of the electronic device 1000, and input data or output data for a command associated with the stored various data. The memory 1200 may include at least one of the volatile memory 1210 and the non-volatile memory 1220.

The input module 1300 may receive a command or data to be used for the components (e.g., the processor 1100, the sensor module 1610, or the sound output module 1630) of the electronic device 1000 from an outside of the electronic device 1000 (e.g., the user or the external electronic device 2000).

The input module 1300 may include: a first input module 1310 configured to receive a command or data from the user; and a second input module 1320 for configured to receive a command or data from the external electronic device 2000. The first input module 1310 may include a microphone, a mouse, a keyboard, a key (e.g., a button), or a pen (e.g., a passive pen or an active pen). The second input module 1320 may support a designated protocol capable of enabling wired or wireless connection with the external electronic device 2000. According to one embodiment, the second input module 1320 may include a high-definition multimedia interface (HDMI), a universal serial bus (USB) interface, an SD card interface, or an audio interface. The second input module 1320 may include a connector capable of enabling physical connection with the external electronic device 2000, for example, an HDMI connector, a USB connector, an SD card connector, or an audio connector (e.g., a headphone connector).

The display module 1400 may visually provide information to the user. The display module 1400 may include a display panel 1410, a gate driver 1420, and a data driver 1430. The display module 1400 may further include a window, a chassis, and a bracket configured to protect the display panel 1410. In this case, the gate driver 1420 and the data driver 1430 may be the gate driver and the data driver in FIG. 1, respectively.

The display panel 1410 may include a liquid crystal display panel, an organic light emitting display panel, or an inorganic light emitting display panel, and a type of display panel 1410 is not particularly limited. The display panel 1410 may be a rigid type or a flexible type that may be rolled or folded. The display module 1400 may further include a supporter, a bracket, a heat dissipation member, or the like configured to support the display panel 1410.

The gate driver 1420 may be mounted on the display panel 1410 as a driving chip. In addition, the gate driver 1420 may be integrated on the display panel 1410. For example, the gate driver 1420 may include an amorphous silicon TFT gate driver circuit (ASG), a low-temperature polycrystalline silicon (LTPS) TFT gate driver circuit, or an oxide semiconductor TFT gate driver circuit (OSG), which is embedded in the display panel 1410. The gate driver 1420 may receive a control signal from the controller 1120-1, and output gate signals to the display panel 1410 in response to the control signal.

The display panel 1410 may further include an emission driver. The emission driver may output an emission signal to the display panel 1410 in response to the control signal received from the controller 1120-1. The emission driver may be formed separately from the gate driver 1420, or may be integrated into the gate driver 1420.

The data driver 1430 may receive the control signal from the controller 1120-1, convert the data signal into an analog voltage (e.g., a data voltage) in response to the control signal, and output data voltages to the display panel 1410.

The data driver 1430 may be integrated into another component (e.g., the controller 1120-1). The functions of the interface conversion circuit and the timing control circuit of the controller 1120-1 described above may be integrated into the data driver 1430.

The display module 1400 may further include a light emission driver, a voltage generation circuit, and the like. The voltage generation circuit may output various voltages required for driving the display panel 1410.

The power module 1500 may supply a power to the components of the electronic device 1000. The power module 1500 may include a battery configured to charge a power voltage. The battery may include a primary battery that is non-rechargeable, and a secondary battery or a fuel battery, which is rechargeable. The power module 1500 may include a power management integrated circuit (PMIC). The PMIC may supply an optimized power to each of the modules described above and modules that will be described below. The power module 1500 may include a wireless power transmission/reception member electrically connected to the battery. The wireless power transmission/reception member may include a plurality of antenna radiators having a coil shape.

The electronic device 1000 may further include an internal module 1600 and an external module 1700. The internal module 1600 may include a sensor module 1610, an antenna module 1620, and a sound output module 1630. The external module 1700 may include a camera module 1710, a light module 1720, and a communication module 1730.

The sensor module 1610 may sense an input caused by a body of the user or an input caused by the pen among the first input module 1310, and may generate an electrical signal or a data value corresponding to the input. The sensor module 1610 may include at least one of a fingerprint sensor 1610-1, an input sensor 1610-2, and a digitizer 1610-3.

The fingerprint sensor 1610-1 may generate a data value corresponding to a fingerprint of the user. The fingerprint sensor 1610-1 may include one of optical or capacitive fingerprint sensors.

The input sensor 1610-2 may generate a data value corresponding to coordinate information of the input caused by the body of the user or the input caused by the pen. The input sensor 1610-2 may generate a capacitance variation caused by the input as the data value. The input sensor 1610-2 may sense an input caused by the passive pen, or may transmit/receive data to/from the active pen.

The input sensor 1610-2 may measure a bio signal such as a blood pressure, moisture, or body fat. For example, when the user does not move for a predetermined time while allowing a portion of the body to make contact with a sensor layer or a sensing panel, the input sensor 1610-2 may sense the bio signal to output information desired by the user to the display module 1400 based on an electric field variation caused by the portion of the body.

The digitizer 1610-3 may generate a data value corresponding to coordinate information of the input caused by the pen. The digitizer 1610-3 may generate an electromagnetic variation caused by the input as the data value. The digitizer 1610-3 may sense the input caused by the passive pen, or may transmit/receive data to/from the active pen.

At least one of the fingerprint sensor 1610-1, the input sensor 1610-2, and the digitizer 1610-3 may be implemented as a sensor layer formed on the display panel 1410 through consecutive processes. The fingerprint sensor 1610-1, the input sensor 1610-2, and the digitizer 1610-3 may be disposed on the display panel 1410, and one of the fingerprint sensor 1610-1, the input sensor 1610-2, and the digitizer 1610-3, for example, the digitizer 1610-3 may be disposed under the display panel 1410.

At least two of the fingerprint sensor 1610-1, the input sensor 1610-2, and the digitizer 1610-3 may be integrated into one sensing panel through the same process. When integrated into one sensing panel, the sensing panel may be disposed between the display panel 1410 and the window disposed on the display panel 1410. According to one embodiment, the sensing panel may be disposed on the window, and a location of the sensing panel is not particularly limited.

At least one of the fingerprint sensor 1610-1, the input sensor 1610-2, and the digitizer 1610-3 may be embedded in the display panel 1410. In other words, at least one of the fingerprint sensor 1610-1, the input sensor 1610-2, and the digitizer 1610-3 may be simultaneously formed through a process of forming elements included in the display panel 1410 (e.g., a light emitting element, a transistor, etc.).

In addition, the sensor module 1610 may generate an electrical signal or a data value corresponding to an internal state or an external state of the electronic device 1000. The sensor module 1610 may further include, for example, a gesture sensor, a gyro sensor, an atmospheric pressure sensor, a magnetic sensor, an acceleration sensor, a grip sensor, a proximity sensor, a color sensor, an infrared (IR) sensor, a biosensor, a temperature sensor, a humidity sensor, or an illuminance sensor.

The antenna module 1620 may include at least one antenna configured to transmit a signal or a power to the outside or receive the signal or the power from the outside. According to one embodiment, the communication module 1730 may transmit the signal to the external electronic device or receive the signal from the external electronic device through an antenna suitable for a communication scheme. An antenna pattern of the antenna module 1620 may be integrated into one of the components of the display module 1400 (e.g., the display panel 1410), the input sensor 1610-2, or the like.

The sound output module 1630 may be a device configured to output a sound signal to the outside of the electronic device 1000, and may include, for example, a speaker used for general purposes such as multimedia playback or recording playback, and a receiver used exclusively for receiving a phone call. According to one embodiment, the receiver may be formed integrally with or separately from the speaker. A sound output pattern of the sound output module 1630 may be integrated into the display module 1400.

The camera module 1710 may capture a still image and a moving image. According to one embodiment, the camera module 1710 may include at least one lens, image sensor, or image signal processor. The camera module 1710 may further include an infrared camera capable of measuring presence or absence of the user, a location of the user, a line of sight of the user, and the like.

The light module 1720 may provide a light. The light module 1720 may include a light emitting diode or a xenon lamp. The light module 1720 may operate in conjunction with the camera module 1710, or may operate independently.

The communication module 1730 may support establishing a wired or wireless communication channel between the electronic device 1000 and the external electronic device 2000, and may support performing communication through the established communication channel. The communication module 1730 may include one or both of a wireless communication module such as a cellular communication module, a short-range wireless communication module, or a global navigation satellite system (GNSS) communication module and a wired communication module such as a local area network (LAN) communication module or a power line communication module. The communication module 1730 may communicate with the external electronic device 2000 through a short-range communication network such as Bluetooth, Wi-Fi direct, or infrared data association (IrDA) or a long-range communication network such as a cellular network, the Internet, or a computer network (e.g., LAN or WAN). Various types of the communication modules 1730 described above may be implemented as a single chip, or may be implemented as separate chips, respectively.

The input module 1300, the sensor module 1610, the camera module 1710, and the like may be used to control an operation of the display module 1400 in conjunction with the processor 1100.

The processor 1100 may output the command or data to the display module 1400, the sound output module 1630, the camera module 1710, or the light module 1720 based on the input data received from the input module 1300. For example, the processor 1100 may generate a data signal corresponding to the input data applied through the mouse, the active pen, or the like to output the generated data signal to the display module 1400, or may generate command data corresponding to the input data to output the generated command data to the camera module 1710 or the light module 1720. The processor 1100 may switch an operation mode of the electronic device 1000 to a low-power mode or a sleep mode so as to reduce a power consumed by the electronic device 1000 when the input data is not received from the input module 1300 for a predetermined time.

The processor 1100 may output the command or data to the display module 1400, the sound output module 1630, the camera module 1710, or the light module 1720 based on sensing data received from the sensor module 1610. For example, the processor 1100 may compare authentication data applied by the fingerprint sensor 1610-1 with authentication data stored in the memory 1200, and execute an application according to a comparison result. The processor 1100 may execute a command or output a corresponding data signal to the display module 1400 based on the sensing data sensed by the input sensor 1610-2 or the digitizer 1610-3. When the sensor module 1610 includes a temperature sensor, the processor 1100 may receive temperature data on a temperature measured by the sensor module 1610, and may further perform luminance correction and the like on the data signal based on the temperature data.

The processor 1100 may receive measurement data on the presence or absence of the user, the location of the user, the line of sight of the user, and the like from the camera module 1710. The processor 1100 may further perform the luminance correction and the like on the data signal based on the measurement data. For example, the processor 1100 that has determined the presence or absence of the user through an input from the camera module 1710 may output a data signal in which a luminance is corrected through the data conversion circuit 1120-2 or the gamma correction circuit 1120-3 to the display module 1400.

Some of the components described above may be connected to each other through a communication scheme between peripheral devices, for example, a bus, general purpose input/output (GPIO), a serial peripheral interface (SPI), a mobile industry processor interface (MIPI), or an ultra-path interconnect (UPI) link so as to exchange a signal (e.g., the command or data) with each other. The processor 1100 may communicate with the display module 1400 through a prescribed interface, may use, for example, one of the communication schemes described above, and is not limited to the communication schemes described above.

According to various embodiments of the present disclosure, the electronic device 1000 may be various types of devices. The electronic device 1000 may include, for example, at least one of a portable communication device (e.g., a smart phone), a computer device, a portable multimedia device, a portable medical device, a camera, a wearable device, or a home appliance. The electronic device 1000 according to an embodiment of the present disclosure is not limited to the devices described above.

The present disclosure may be applied to a display device and an electronic device including the display device. For example, the present disclosure may be applied to a digital television, a 3D television, a smart phone, a cellular phone, a personal computer (PC), a tablet PC, a virtual reality (VR) device, a home appliance, a laptop, a personal digital assistant (PDA), a portable media player (PMP), a digital camera, a music player, a portable game console, a car navigation system, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present disclosure. Accordingly, all such modifications are intended to be included within the scope of the present disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:

a display panel including pixel driving circuits and light emitting elements;

a data driver configured to output data voltages to the pixel driving circuits; and a timing controller configured to control the data driver, wherein the data driver includes:

a first amplifier configured to output first data voltages to a first data line connected to first pixel driving circuits arranged in a first column and output second data voltages to a second data line connected to second pixel driving circuits arranged in a second column; and second amplifiers configured to output third data voltages to third data lines connected to third pixel driving circuits arranged in third columns which are disposed between the first column and the second column, wherein the pixel driving circuits arranged in the first column are configured to drive the light emitting elements arranged in the first column, and wherein the pixel driving circuits arranged in the second column are configured to drive the light emitting elements arranged in at least one of the third columns.

2. The display device of claim 1, wherein the first amplifier is configured to selectively output the first data voltages to the pixel driving circuits connected to the first data line and the second data voltages to the pixel driving circuits connected to the second data line.

3. The display device of claim 1, wherein the first amplifier is configured to alternately output the first data voltages to the pixel driving circuits connected to the first data line and the second data voltages to the pixel driving circuits connected to the second data line.

4. The display device of claim 1, wherein the first data line and the second data line are connected to each other through a connection line, and wherein the first amplifier is connected to the connection line.

5. The display device of claim 4, wherein the display panel includes a display part configured to display an image and a peripheral part disposed adjacent to the display part, and wherein the connection line is disposed in the peripheral part.

6. The display device of claim 5, wherein the first amplifier and the second amplifiers are disposed adjacent to the display panel in a second direction, and wherein the connection line is disposed adjacent to the display part in the second direction.

7. The display device of claim 5, wherein the first amplifier and the second amplifiers are disposed adjacent to the display panel in a second direction, and wherein the connection line is disposed adjacent to the display part in a direction opposite to the second direction.

8. The display device of claim 4, wherein the display panel includes a display part configured to display an image and a peripheral part disposed adjacent to the display part, and wherein the connection line is disposed in the display part.

9. The display device of claim 1, wherein each of the first data line, the second data line, and the third data lines is connected to pixel driving circuits which drive the light emitting elements configured to display a same color.

10. The display device of claim 1, wherein the first column includes:

first color light emitting elements configured to display a first color; and third color light emitting elements configured to display a third color, and wherein the at least one of the third columns includes:

second color light emitting elements configured to display a second color.

11. The display device of claim 1, wherein the first amplifier is configured to output data voltages to the first data line and the second data line in response to a first clock signal and to output data voltages to at least one third data line among the third data lines in response to a second clock signal.

12. The display device of claim 11, wherein the second clock signal has a phase that is opposite to a phase of the first clock signal.

13. The display device of claim 1, wherein each of the second amplifiers is configured to output data voltages to at least one third data line in response to a first clock signal and to output data voltages to at least another third data line in response to a second clock signal.

14. A data driver configured to output data voltages to pixel driving circuits of a display panel connected to first to third data lines, the data driver comprising:

a first amplifier configured to selectively output first data voltages to first pixel driving circuits connected to the first data line and arranged in a first column and to second pixel driving circuits connected to the second data line and arranged in a second column; and second amplifiers configured to output third data voltages to third pixel driving circuits connected to the third data lines and arranged in third columns which are disposed between the first column and the second column, wherein the pixel driving circuits arranged in the first column are configured to drive light emitting elements arranged in the first column, and wherein the pixel driving circuits arranged in the second column are configured to drive light emitting elements arranged in at least one of the third columns.

15. The data driver of claim 14, wherein the first amplifier is configured to alternately output the first data voltages to the pixel driving circuits connected to the first data line and the second data voltages to the pixel driving circuits connected to the second data line.

16. The data driver of claim 14, wherein the first amplifier is configured to output the first data voltages to the first data line and the second data voltages to the second data line in response to a first clock signal and to output the third data voltages to at least one third data line among the third data lines in response to a second clock signal.

17. The data driver of claim 16, wherein the second clock signal has a phase that is opposite to a phase of the first clock signal.

18. The data driver of claim 14, wherein each of the second amplifiers is configured to output data voltages to at least one third data line in response to a first clock signal and to output data voltages to at least another third data line in response to a second clock signal.

19. An electronic device comprising:

a main processor; and a display panel receiving input image data from the main processor, the display panel including:

a plurality of pixels including a plurality of pixel driving circuits and a plurality of light emitting elements;

a data driver configured to output data voltages to the pixel driving circuits; and a timing controller configured to control the data driver, wherein the data driver includes:

a first amplifier configured to output first data voltages to a first data line connected to first pixel driving circuits arranged in a first column and output second data voltages to a second data line connected to second pixel driving circuits arranged in a second column; and second amplifiers configured to output third data voltages to third data lines connected to third pixel driving circuits arranged in third columns which are disposed between the first column and the second column, wherein the pixel driving circuits arranged in the first column are configured to drive the light emitting elements arranged in the first column, and wherein the pixel driving circuits arranged in the second column are configured to drive the light emitting elements arranged in at least one of the third columns.

* * * * *